United States Patent [19]

Hooshiari

[11] Patent Number: 5,581,610
[45] Date of Patent: Dec. 3, 1996

[54] METHOD FOR NETWORK TRAFFIC REGULATION AND MANAGEMENT AT A MEDIATED ACCESS SERVICE CONTROL POINT IN AN OPEN ADVANCED INTELLIGENT NETWORK ENVIRONMENT

[75] Inventor: Alireza Hooshiari, Atlanta, Ga.

[73] Assignee: Bellsouth Corporation, Atlanta, Ga.

[21] Appl. No.: 325,803

[22] Filed: Oct. 19, 1994

[51] Int. Cl.$^6$ .................................................. H04M 15/00
[52] U.S. Cl. .......................... 379/133; 379/111; 379/112; 379/113; 379/114; 379/115; 379/134; 379/137; 379/138
[58] Field of Search ...................................... 379/111, 112, 379/113, 114, 115, 133, 134, 137, 138, 207, 219, 220

[56] References Cited

U.S. PATENT DOCUMENTS

| | | | |
|---|---|---|---|
| 4,788,718 | 11/1988 | McNabb | 379/113 |
| 5,103,475 | 4/1992 | Shuen | 379/115 |
| 5,247,571 | 9/1993 | Kay | 379/112 |
| 5,448,617 | 9/1995 | Hong | 379/114 |

Primary Examiner—Wellington Chin
Assistant Examiner—Vijay Shankar
Attorney, Agent, or Firm—Jones & Askew

[57] ABSTRACT

A method of regulating and managing network traffic at a mediated access service control point in an advanced intelligent switched telephone network that allows a local exchange carrier to monitor and enforce traffic rates negotiated between the local exchange carrier and other third party providers. The invention is implemented at a mediated access service control point in the network, and is activated when a query destined for a third party service control point is generated at a service switching point. The mediated access service control point receives this query and processes the query to determine if the query should be forwarded to the third party service control point. If the query does not violate any of the rates that have been negotiated between the local exchange carrier and the third party, the query is passed from the mediated access service control point to the third party service control point. If the query causes one or more of the negotiated rates to be violated, the query is default treated in a manner predetermined by the local exchange carrier.

8 Claims, 9 Drawing Sheets

METHOD FOR NETWORK TRAFFIC REGULATION AND MANAGEMENT AT A MEDIATED ACCESS SERVICE CONTROL POINT IN AN OPEN ADVANCED INTELLIGENT NETWORK ENVIRONMENT

TECHNICAL FIELD

The present invention relates to the field of switched telephony, and in particular to a method of regulating and managing network traffic on an intelligent switched telephone network.

BACKGROUND OF THE INVENTION

Two main attributes of the modern intelligent public switched telephone network are its flexibility and accessibility. The network's flexibility allows local exchange carriers to more easily implement new network subscriber services at the local exchange carrier databases. The network's flexibility also allows the physical components of the network to vary according to particular subscriber needs and network applications. In addition, the network's accessibility will allow, subsequent to future action by the Federal Communications Commission and state public service commissions, third party providers such as cable companies and cellular communications companies (hereinafter referred to as Other Service Providers, or OSPs), to access local exchange carrier databases, usually after negotiating with the local exchange carrier for an allowed amount of network traffic flow.

The underlying reason for the network's flexibility and accessibility lies in its system architecture—the Advanced Intelligent Network (AIN) architecture. Ever since its development and subsequent deployment, the AIN architecture has allowed new network services to be introduced by local exchange carriers more rapidly and with fewer associated development costs than earlier networks. At the same time, it has allowed the local exchange carriers to more easily manage such services. Not surprisingly, subsequent to the deployment of this open architecture, local exchange carriers successfully introduced a myriad of new network services to network subscribers in the past few years, and OSPs are expected to provide many more upon opening of the AIN.

As a result of the introduction of this myriad of new network services, the flow of network traffic at various levels of the network will increase substantially, and, as OSPs begin to provide an increasing number of services, the need to effectively monitor and control network traffic will become a necessity to prevent network overload and to ensure that traffic associated with particular OSPs does not exceed negotiated rates.

Figure 1:
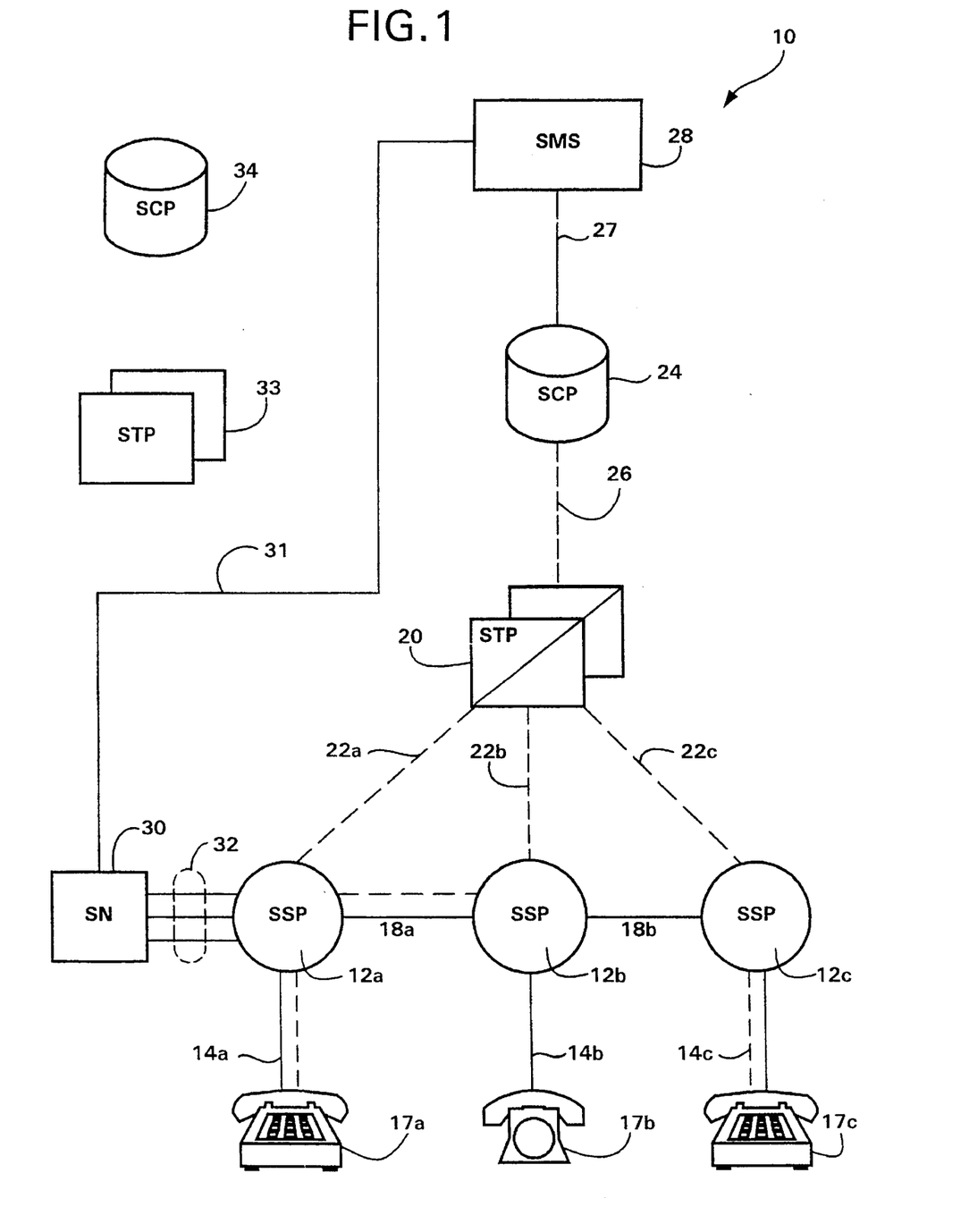
FIG. 1 is a block diagram of the environment in which the preferred embodiment of the present invention operates.

In light of the above, and in order to fully understand the need for the present invention, it is first necessary to understand the basic architecture of the AIN. FIG. 1 is a block diagram of the AIN environment and shows the components of the AIN generally at 10. These components contain most of the intelligence in the network and are well known to those skilled in the art.

Each of a plurality of central office switches is equipped with a service switching point (SSP) node on the Advanced Intelligent Network. A plurality of representative SSPs are shown as 12a–12c in FIG. 1. Those skilled in the art will recognize that each service switching point is the Advanced Intelligent Network component of a typical electronic central office switch as used by a local exchange carrier. The dashed lines between SSPs in FIG. 1 indicate that an arbitrary number may be associated with the network operated by any given local exchange carrier. Each of the SSPs 12a–12c is equipped with appropriate hardware and software for the generation of triggers in response to activity on dialing lines and for accepting instructions from service control points and elsewhere in the Advanced Intelligent Network. Emanating from each central office associated with SSPs 12a–12c are respective subscriber lines 14a–14c, which are terminated by respective telephone sets 17a–17c. Typically, each central office switch associated with an SSP will be connected to 10,000–70,000 subscriber lines. A particular subscriber number within the network is associated with a connection through a particular one of subscriber lines 14a–14c. Thus, each SSP will generate appropriate triggers that include information identifying the particular subscriber line when a piece of customer premises equipment 17a–17c connected to the line goes off hook, commences dialing, etc. The nature and format of such triggers is known to those skilled in the art and is specified in the Signaling System 7 (SS7) protocol.

It should be understood that telephone sets 17a–17c are generalized representations of terminating customer premises equipment. Therefore, in addition to conventional telephone sets, devices such as facsimile machines, automatic dialers, and the like can also be connected to subscriber lines. Furthermore, it should be understood that certain call rerouting functions implemented through the Advanced Intelligent Network can cause a particular subscriber number to be temporarily associated with a different subscriber line other than that with which it is normally associated. For example, implementation of call forwarding through the network when the Advanced Intelligent Network completes a call to a particular subscriber number to a different subscriber line, based on instructions issued by the user of the subscriber number, will temporarily associate calls to a subscriber number with a different subscriber line.

The central offices associated with the SSPs 12a–12c in turn communicate with each other through a plurality of trunk circuits indicated at 18a and 18b in FIG. 1. These trunk circuits interconnect the central offices and are the voice path trunks that connect communications when completed. It is to be understood that a network communication may be an ordinary telephone call, a data transmission, or any other type of message generated by a calling party over the network and directed to a telephone number of a called party also on the network. It should also be understood that, in a typical network, the trunk circuits 18a and 18b do not represent the only connection paths among the central offices associated with SSPs 12a, 12b and 12c. The Advanced Intelligent Network keeps track of line status and can complete a call through trunk circuits through remote central offices if no direct connection between the central office connected to the originating subscriber line and the central office connected to the terminating subscriber line is available.

Data links 22a, 22b and 22c respectively connect SSPs 12a, 12b and 12c to a local signal transfer point (STP) 20. These data links are typically 56 kilobit per second bi-directional data links using the Signaling System 7 (SS7) protocol. This SS7 protocol is well known to those skilled in the art and is described in a specification available through the American National Standards Institute (ANSI). The SS7 protocol is a layered protocol; each layer provides services for layers above it and relies on layers below it for services. The protocol employs packets with beginning and terminating flags and a check bit. The packets also provide a signal information field with variable length user specific data and a routing label. The packets further provide a service information octet that identifies a priority of the message, the destination of the message on a national network level, and the user name identifying the entity that created the message. The packets also include control and sequence numbers with uses and designations well known to those skilled in the art and described in further detail in the aforementioned ANSI specification.

SS7 data packets generated by the SSPs 12a, 12b and 12c are sent from the SSPs to the STP 20. A signal transfer point such as the STP 20 is not normally the end destination of these packets; rather, it is a multi-port high speed switch programmed to direct traffic among the other components in the network. The STP 20 switches the packets in response to routing information contained in the layered protocol of the packets conveyed over data links 22a, 22b and 22c. It should also be noted that service transfer points such as STP 20 are installed in redundant pairs to ensure uninterrupted service over the network should one of the STPs in the pair fail.

The local STP 20 is in turn connected, through SS7 data link 26, to a local service control point (SCP) 24 of the type well known to those skilled in the art. Service control points such as the SCP 24 are implemented by powerful, relatively fault tolerant computers such as the Star Server FT Model 3200 or the Star Server FT Model 3300, both sold by American Telephone & Telegraph Company. The architectures of these computers are based on Tandem Integrity S2 and Integrity S1 platforms, respectively. These computers have from 1 to 27 disk drives in sizes ranging from 300 megabytes to 1.2 gigabytes per drive and main memory ranging from 24 to 192 megabytes. This processing power allows the computers to execute up to 17 million instructions per second. With SS7 protocol, this equates to 50 to 100 transactions (query/response pairs) of network messages per second. As with the aforementioned STPs, these SCPs are implemented in redundant pairs to ensure continued operation of the network in the event that one of the SCPs in the pair fails.

Service control points contain much of the intelligence necessary to implement the limited access features associated with the present invention. For example, the SCP 24 contains subscriber databases associated with subscriber numbers connected to SSPs 12a, 12b and 12c. When a communication is placed from a particular subscriber number, several triggers are defined at the associated SSP for that particular communication. Each trigger generates a data packet and sends it to the SCP 24. Each trigger prompts the SCP to query a database containing customized communication handling instructions subscribed to by particular subscriber numbers. The SCP 24 determines what types of specialized processing instructions, if any, to implement in association with the communication. The packet may instruct the SSP to route the communication in accordance with specialized communication handling instructions or to route the communication in a manner commonly known to those skilled in the art as Plain Old Telephone Service (POTS), depending upon the database instructions particular to each subscriber number.

The SCP databases are updated with information provided from a Service Management System (SMS) 28 through SS7 data link 27. The SMS 28 is also implemented by a powerful general purpose digital computer. When a subscriber modifies his or her customized communication handling instructions, the SMS 28 updates the subscriber features by downloading this new information to the databases at the SCP 24 through data link 27. The SMS 28 also downloads, on a non-real-time basis, billing information needed to invoice subscribers for the customized features provided.

The SMS 28 is also connected to and services a service node (SN) 30 via data link 31. As shown in FIG. 1, the service node 30 is typically connected to only a few SSPs via integrated service digital network (ISDN) links shown at 32. This service node is of the type well known to those skilled in the art and is implemented by the same types of computers that implement the SCP 24. The SN 30 includes the database and computing capabilities possessed by the SCP 24. In addition, the SN 30 also includes voice and DTMF signal recognition and voice synthesis capabilities. Thus, while the physical embodiments of the SCP 24 and the SN 30 are similar, their functions are different. While service control points normally implement database inquiry and routing services that occur prior to completion of a communication (providing a ringing signal to the called subscriber and a ring back to the calling subscriber), service nodes such as SN 30 are used to implement communication handling instructions requiring an audio connection or to facilitate transfer of a large amount of data during or subsequent to a communication placed over the network. Thus, services implemented during a communication usually require the use of a service node.

The network also includes a regional STP 33, connected to the local STP 20 via an SS7 data link (not shown), and a regional SCP 34, connected to the regional STP 32 and the SMS 28 through SS7 data links (not shown). Information downloaded to the local STP 20 and the local SCP 24 is also supplied to these regional devices. These regional devices thus allow subscriber communication handling instructions associated with particular subscriber numbers to be implemented on a network-wide basis regardless of the physical location of the subscriber number in the network.

Currently, an Automatic Code Gap (ACG) program is implemented at the SCP level to reduce the flow of traffic to the SCP 24 from the SSPs. The program may be automatically initiated by the SCP based upon certain activation criteria, or it may be manually activated by a Network Manager. The ACG program may also be initiated either selectively to control a particular customer or service or non-selectively to control the flow of all traffic supported by the SCP. If the ACG is being initiated selectively, the ACG program is implemented by associating a code on which the ACG is to be activated with a controlled entity such as a subscriber, a service, or an SCP. The ACG program operates on a response basis, such that, upon the program being activated at the SCP in one of the two ways mentioned above, the SCP forwards an ACG traffic-control message to the ACG-supported SSPs. The traffic-control message causes the SCP to regulate the flow of traffic to the SCP to protect the SCP from overloads.

However, in a mediated network environment, three network traffic control problems will arise in such a network when OSP service control points are implemented in conjunction with a mediated access service control point. These problems, as discussed below, make the use of an ACG for inter-SCP traffic control impractical and obsolete. First, the destination of a query is unknown until the MA SPA implemented at the SCP translates the query. Thus, when OSP SCPs are implemented in a mediated network environment, it will not be practical to activate an ACG program to control network traffic to the OSP SCP at the SSP level because an SSP will be incapable of determining an OSP SCP query destination. The SPA must complete its translation at the SCP in order for the query destination to be determined. The ACG program at the SSP will not be capable of selectively reducing the query rate to an OSP SCP because the SSP does not know the final destination of the query. In other words, the intermediate point for a query being processed from an SSP to an OSP SCP is a MA SCP. The routing data for the query is contained within the MA SCP, but not in the SSP. Therefore, the MA SCP knows the final destination (the appropriate OSP SCP) for a query while the SSP does not. Based upon these parameters, the inefficiency and ineffectiveness of activating an ACG program at the SSP level is obvious to one skilled in the art.

Second, the ACG program will be ineffective in regulating traffic between the SSPs and the OSP SCPs due to the reshaping of the query traffic at the SCP. When the SCP functions as a mediated access point, it alters the arrival characteristics of the traffic to the OSP SCPs due to associated interprocessing delays. As a result, the SCP effectively initiates new traffic streams to the OSP SCPs. Reduction in query traffic thus has to be done at the point at which traffic streams are initiated for the OSP SCPs—the MA SCP. If the ACG program is used to regulate OSP SCP traffic at the SSP level, over controlling or under controlling of the traffic to the OSP SCPs may result, as the traffic would be controlled at both the SSP and the SCP level. It is much more efficient to regulate traffic to a destination from the immediate or closest source to that destination. The closest source of traffic for an OSP SCP is the MA SCP and, therefore, it is more efficient to regulate traffic to the OSP SCP from the MA SCP.

Third, the ACG program will be ineffective in enforcing traffic rates negotiated between the local exchange carrier and the OSPs. It is difficult to enforce the negotiated traffic rates because using ACG is not an exact method, it is only an approximation. It is also difficult to implement an instantaneous maximum and sustainable average for query traffic using an ACG program. OSPs negotiate traffic rates with local exchange carriers who own and service the SCP. When such traffic rates are negotiated, it is desirable that the operator ensures that the negotiated traffic rate is sustained over a specified length of time, given that the demand for the services provided by the OSPs exists. The ACG program provides no means for sustaining these negotiated rates over periods of time.

In summary, the Automatic Code Gapping program that is normally used at the SSP level to control traffic flow to the SCP will not be as effective in a mediated environment due to the reasons set forth above.

Thus, there is a need in the art for a methodology of regulating traffic flow from a SCP to associated OSP SCPs in a mediated network environment in a manner that addresses the above needs. In particular, it is desirable to have a system that can regulate this traffic at the SCP level, as opposed to the SSP level, in order to prevent severe over or under controlling of such traffic. Furthermore, there is a need for a system that can regulate traffic on the SCP level while allowing a local exchange carrier to have full control over the network traffic through its SCP. In addition, there is a need for a system with a traffic control and management mechanism to ensure that the traffic flow to the OSP SCPs matches the negotiated traffic rates by reducing excessive traffic to an OSP SCP. Further, there is a need for providing for the surveillance of the traffic rates for each OSP SCP without using a large amount of SCP processing capacity thereby minimizing extra delays in the network.

SUMMARY OF THE INVENTION

The present invention includes methods for regulating and managing network traffic in an open Advanced Intelligent Network environment through the use of network elements located at a mediated access service control point (MA SCP). The motivation behind the present invention is a need to provide a local exchange carrier with a means for controlling the ever increasing amount network traffic resulting from an increasing number of OSPs accessing services and databases located at exchange carrier service control points.

The present invention overcomes the aforementioned limitations associated with controlling traffic at the SSP level through an ACG program. In particular, the present invention overcomes the problems associated with the inherent processing delays and the reshaping of the traffic that occurs at the SCP. Also, the present invention provides a means for maintaining negotiated rates over a period of time.

Stated in its broadest form, the present invention comprises a method of regulating traffic in an intelligent switched telephone network having several OSP service control points and a mediated access service control point (MA SCP). The mediated access service control point includes a first traffic monitoring and control point operative for limiting the maximum number of queries that are passed from network service switching points to an OSP service control point during a period of time referred to as an observation period. The mediated access service control point also includes a second traffic monitoring and control point operative for regulating the number of queries passed from the service switching points to an OSP service control point during a second time period consisting of several observation periods. The method includes the steps of having all queries destined for a service control point to be passed from the service switching points to the mediated access service control point.

At the first traffic monitoring control point, if the number of queries passed to the mediated access service control point in the observation period is greater than a predetermined maximum number, all queries in excess of the maximum are dropped. If the number of queries is less than the predetermined maximum for the observation period, the queries will be passed to the second traffic monitoring and control point.

At the second traffic monitoring and control point, if the number of queries received during an observation period is greater than a predetermined allowable average, all queries are passed to the destination OSP service control point. The second traffic monitoring and control point is then adjusted to allow for a lesser number of queries to be passed during the subsequent observation period. If the number of queries received at the second traffic monitoring and control point is less than the predetermined allowable average, all queries are passed to the destination OSP service control point. The second traffic monitoring and control point is then adjusted to allow a greater number of queries to be passed during the subsequent observation period. If the number of queries received is greater than the predetermined allowable average for a predetermined maximum number of observation periods, the number of queries allowed to pass during subsequent observation periods is maintained so as to sustain the average rate over the second time period.

The number of queries arriving at the first traffic monitoring and control point is tracked by the first traffic monitoring and control point through an associated static counter. The counter is incremented by 1 upon detection of a query that is intended for an OSP service control point, and is decremented to zero upon expiration of the observation period.

As indicated above, the method of the present invention adjusts the second traffic monitoring and control point, allowing it to pass a number of queries either greater than or less than the predetermined average during the subsequent observation period so as to maintain the predetermined average rate over the lengthier second time period. This adjustment is accomplished by incrementing or decrementing a counter threshold of a counter associated with the second traffic monitoring and control point by 1 at the end of an observation period. During the subsequent observation period either 1 more or 1 less query will be allowed to pass, depending on whether the counter was incremented or decremented. If the counter is increased up to a predetermined maximum count, the count will be maintained if subsequent observation periods have excess numbers of queries. If subsequent observation periods have less than the predetermined maximum number of queries, the count will be decremented accordingly.

Therefore, it is an object of the present invention to regulate traffic in an intelligent switched network on the SCP level.

It is also an object of the present invention to provide a method of regulating traffic to OSP SCPs from an MA SCP in an intelligent switched network.

It is a further object of the present invention to provide a local exchange carrier with full control over traffic flowing through its MA SCP.

It is a further object of the present invention to provide local exchange carrier with the capability of monitoring the traffic stream from the MA SCP to each OSP SCP without using a large amount of MA SCP processing capacity and without causing unnecessary delays in the network.

It is a further object of the present invention to provide a method for regulating traffic flow to OSP SCPs via a MA SCP to enforce the traffic rates negotiated by the local exchange carrier with the OSPs and to reduce excessive traffic to the OSP SCPs.

It is a further object of the present invention to provide a method of regulating traffic to OSP SCPs that is more effective than the Automatic Code Gap program presently available.

That the present invention meets these objects and meets the above described needs of particular subscribers will be appreciated from the following description of the various embodiments of the present invention.

DETAILED DESCRIPTION OF THE INVENTION

Turning now to the drawing figures in which like numbers reference like parts or steps, the preferred embodiment of the present invention, hereinafter referred to generally as the Traffic Regulator, will now be described. The existing Advanced Intelligent Network in a typical switched telephone system as shown in FIG. 1 has been described in detail in the Background of the Invention section of the specification. As will now be described below, the present invention, when implemented in the AIN, is an effective mechanism for controlling SCP to SCP traffic, and more particularly for enforcing the negotiated traffic rates between a mediated access SCP and associated OSP SCPs, as will become evident to those skilled in the art upon reading the following specification.

Figure 2:
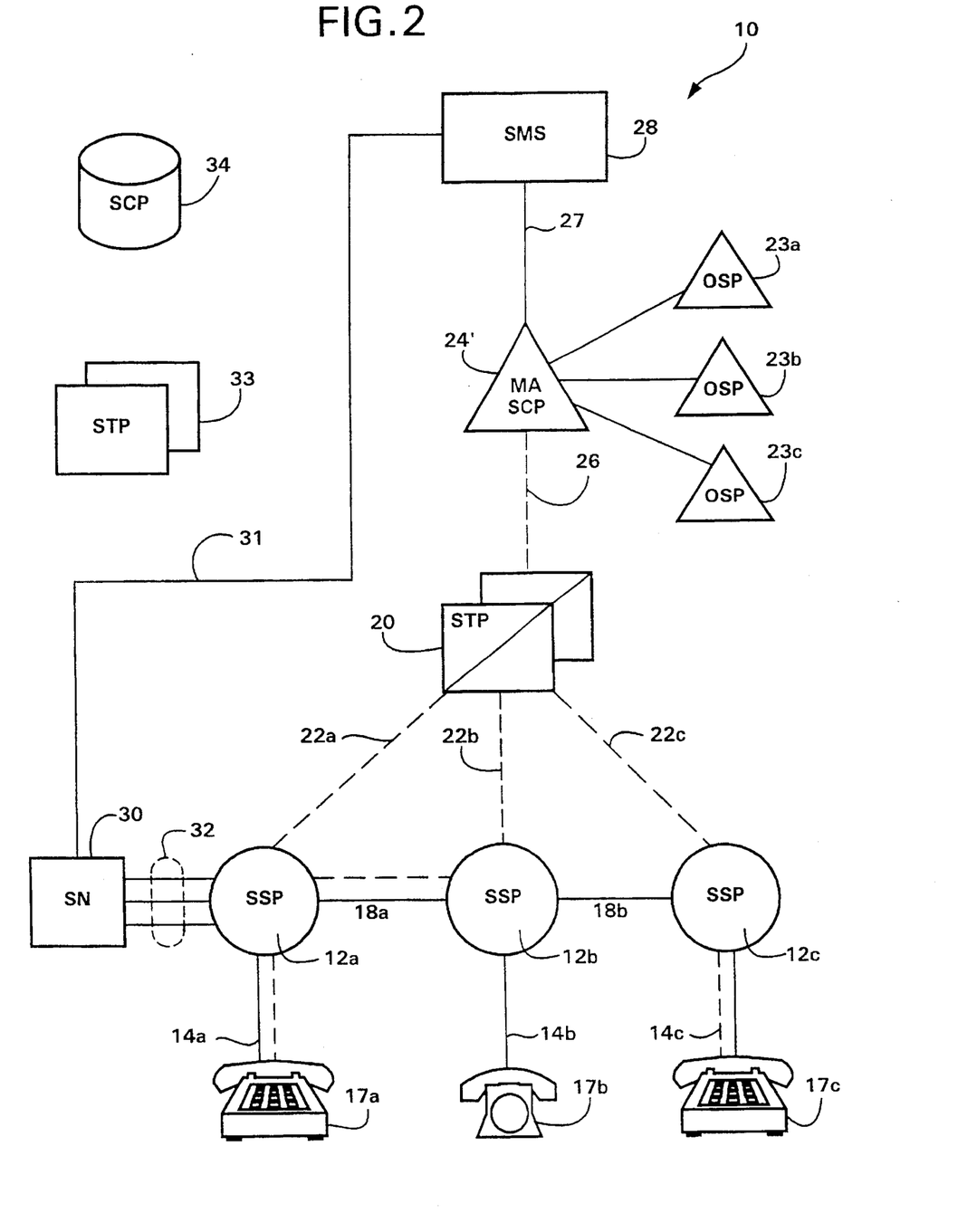
FIG. 2 is a block diagram illustrating mediated access traffic flow occurring as a result of implementation of the present invention.

FIG. 2 is a block diagram of a mediated access network environment in which a mediated access SCP 24' is implemented. This MA SCP is disclosed in pending application Ser. No. 083,984, filed Jun. 28, 1993, entitled "Mediation of Open AIN Interface for Public Switched Telephone Network". The MA SCP 24' passes queries generated at the SSPs from the SSPs to the OSP for which the queries are intended. These OSP SCPs are owned and operated by other service providers who, for a negotiated rate, utilize the routing and database features at the MA SCP 24'. Each OSP SCP is considered to be a subscriber to the mediated access service package application (MA SPA). Thus, when a particular SSP generates a query and forwards it to the MA SCP, the MA SPA determines the query destination and forwards the query to the appropriate OSP SCP. Upon receiving the query from the SSP, the OSP SCP then prepares a response, which is forwarded through the MA SCP to the originating SSP. Upon receiving the response from the OSP SCP, the SSP routes the call accordingly.

Figure 3:
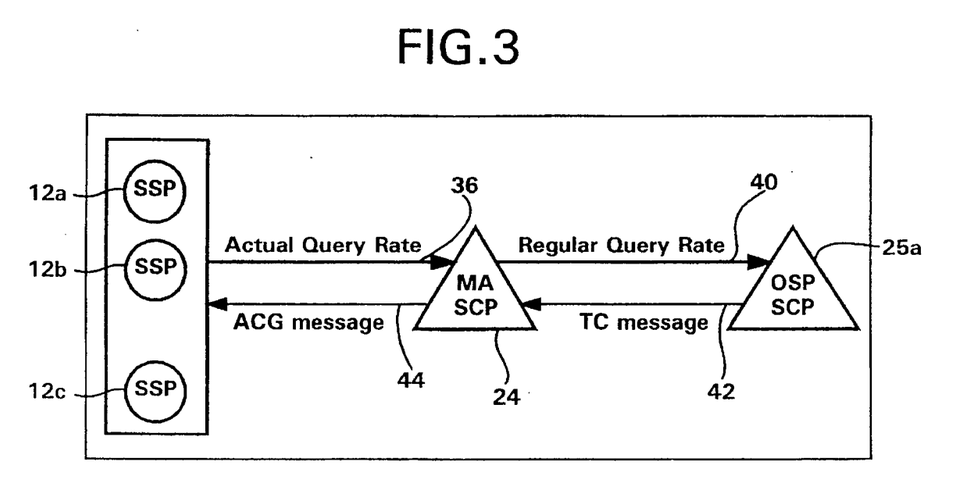
FIG. 3 is a block diagram illustrating the traffic monitoring and control mechanism implemented at the mediated access service control point of the present invention.

FIG. 3 is a pictorial overview of how the present invention regulates query traffic flow to the OSP SCPs. As shown, queries, represented generally by the arrow 36, intended for particular OSP SCPs are initiated at SSPs 12a, 12b and 12c. The queries are routed through the MA SCP 24' where the Traffic Regulator of the present invention, shown generally at 38 in FIG. 4, performs its regulating functions, as will be described in more detail below. The resulting queries in the regulated query rate, represented generally by the arrow 40, then pass to the OSP SCP 25a.

Figure 4:
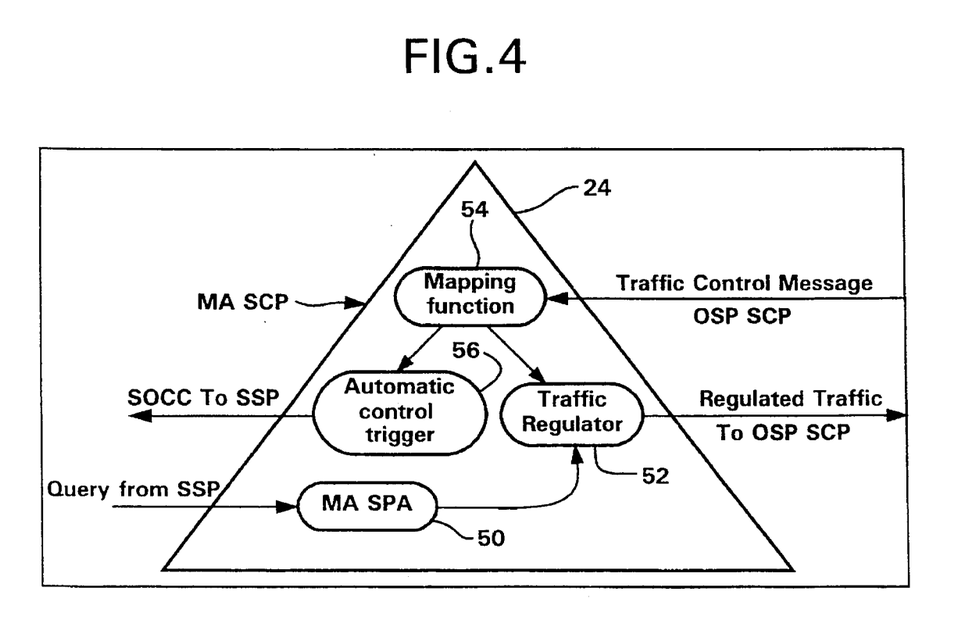
FIG. 4 is a block diagram illustrating in more detail the traffic regulator of FIG. 3.

The parameters of the Traffic Regulator (TR) and its components as shown in FIG. 4 can be input to the SCP by the Service Management System ("SMS") 28 shown in FIG. 2. The parameters of the TR may also be input directly to the SCP via a management console or terminal. The values for the various regulatory parameters of the Traffic Regulator, such as the maximum and average allowable query rates during time periods defined for each rate and the length of the time periods during which the maximum and average allowable rates are monitored, are input through the SMS. These parameters are all part of subscription data for each OSP and will be described in more detail below.

The SMS also collects measurements regarding query traffic flow to a particular OSP SCP. Such measurements include the number of times the maximum allowable query rate is exceeded during a defined time period and the average number of queries directed to an OSP SCP during a defined time period. Detailed lists of these measurements will be provided in the network management plan for the open AIN.

Referring again to FIG. 3, in the case of an overload, the OSP SCP may need to reduce the query rate even further than the regulated query rate and may do so by sending a traffic control message, indicated by the arrow at 42, back to the MA SCP 24'. In response, a mapping function at the MA SCP 24' will map the appropriate control parameters received in the traffic control message to initiate new traffic rates at the Traffic Regulator. The Traffic Regulator will then adjust its parameters accordingly with the new values from the OSP SCP to further reduce query traffic destined for the particular OSP SCP, and will send an ACG message, indicated at 44, back to the SSPs to accordingly regulate the query rate.

The traffic control message contains two parameters. The first parameter specifies a new, reduced traffic rate, while the second parameter specifies the duration of time for which the query traffic should be reduced. Because the traffic control message is so similar to the ACG message (i.e., each has two control parameters), and because some OSP SCPs may only be capable of initiating ACG messages, an ACG message envelope may be used to carry the new traffic control message parameters from the MA SCP to the appropriate SSPs.

In order for the OSP SCP to send such a traffic reduction message to the MA SCP, the OSP SCP must be capable of sending a traffic control message to the MA SCP requesting such query traffic reduction. To initiate such a control message, the OSP SCP must be able to detect its overload conditions and calculate the necessary reduced rate. If the OSP is not capable of calculating such a new rate, it may be programmed to simply notify the MA SCP to completely shut off all query traffic for a certain length of time.

Thus, the Traffic Regulator is capable of regulating traffic flow to the OSP SCPs both by regulating the query rate via internal controls having parameters set in accordance with the OSP negotiated traffic rate and also in response to receiving further indication from an OSP SCP to adjust the negotiated parameters further downward.

FIG. 4 illustrates the internal implementation of the Traffic Regulator at the MA SCP 24'. As shown, a query that arrives at the MA SCP 24' from an SSP is processed by the appropriate Service Program Application, shown generally at 50. Upon being processed by the appropriate SPA, the query is forwarded to the Traffic Regulator. The Traffic Regulator checks its parameters to make sure that the query does not violate any of the OSP SCP negotiated rates. If the query does violate such rates, the query will either be dropped or will be forwarded to the OSP SCP, depending on the circumstances and as will be described in more detail below.

As indicated in FIG. 4 and as described earlier, the OSP SCP may additionally send a traffic control message to further reduce query traffic at the OSP SCP. A mapping function, indicated generally at 54, adjusts the parameters at the Traffic Regulator 52 accordingly. In response, the Traffic Regulator, upon adjustment of the negotiated parameters, will further reduce the query traffic to the OSP SCP. Upon this downward adjustment of the negotiated parameters, the MA SCP 24 activates an automatic control trigger 56 which sends a Selective Overload Code Control ("SOCC") message of the type well known to those skilled in the art to a particular SSP to reduce query traffic from that particular SSP. Upon receiving this SOCC message, the query traffic from that SSP to a particular OSP SCP is reduced.

Figure 5:
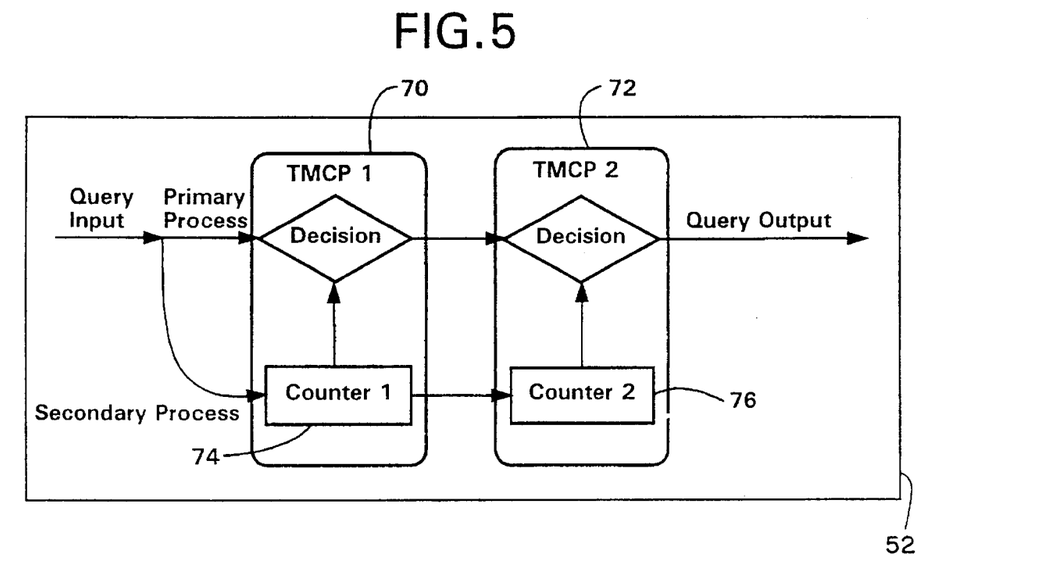
FIG. 5 is a block diagram illustrating in more detail the traffic regulator of FIG. 4.

FIG. 5 illustrates the main components of the Traffic Regulator 52. As shown, the reception of a query by the MA SPA initiates both a primary and a secondary regulation process at Traffic Regulator 53. In the primary process, the query triggers a decision process at a first Traffic Monitoring and Control Point ("TMCP") 70 as to whether the query should be forwarded to the Second Traffic Monitoring and Control Point 72. This decision process is based upon the negotiated parameters at the Traffic Regulator. Also at the TMCP 70, a secondary process is initiated in which a counter 74 associated with the TMCP 70 is incremented by 1 upon the Traffic Regulator detecting the query. If the query does not cause the TMCP 70 parameters to be exceeded, the query is forwarded to the TMCP 72 where a second decision process is initiated, as will be described in more detail below. If the query causes the parameters to be exceeded at the TMCP 70 (i.e., the counter threshold is exceeded as will be described in more detail below), the Traffic Regulator will drop the query and the MA SCP will provide a default treatment of the call associated with the query in a manner well known to those skilled in the art.

If the query is forwarded from the TMCP 70 to the TMCP 72, the primary and secondary processes described above are continued at the TMCP 72. In the primary process, the query is compared to the negotiated parameters at the TMCP 72. In the secondary process, the query causes a Counter 76 to be incremented by 1. If the query does not cause the TMCP 72 parameters to be exceeded, the query is outputted from the Traffic Regulator and forwarded to the appropriate OSP SCP. If the query does cause the parameters to be exceeded, the query receives default treatment. Depending on whether the number of queries received during an observation period is above or below the threshold of the counter 76, the threshold of the counter adjusts upwardly or downwardly to allow more, or fewer, queries to pass during the subsequent observation period as will be described in more detail below.

Figure 6:
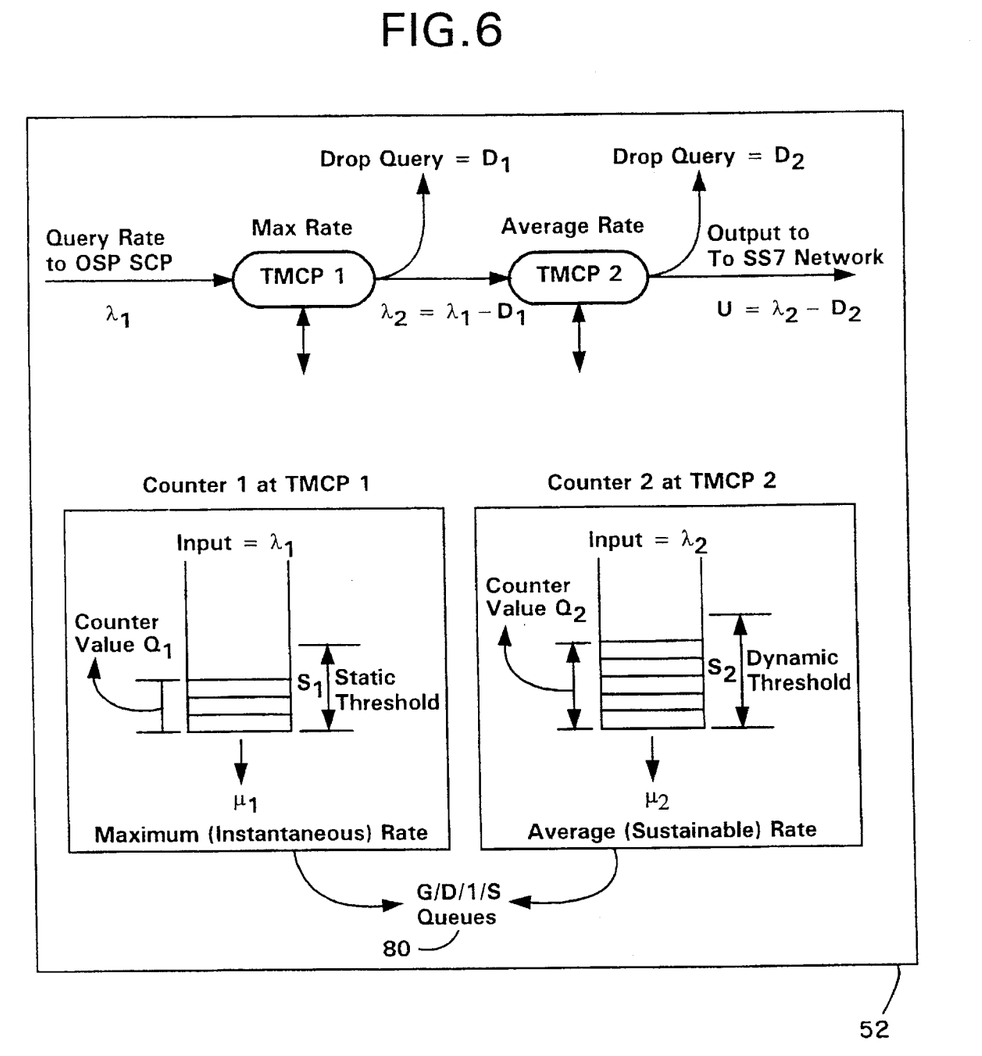
FIG. 6 is a diagram illustrating the changes that occur to the counters of the present invention upon the arrival of query traffic at the first and second traffic monitoring and control points.

Turning now to FIG. 6, the decision making process initiated by the arrival of a query at the Traffic Regulator will be now described in detail. In order to enable the reader to more easily understand the logic implemented at the Traffic Regulator, the following set of symbols will be used when referring to the associated terms.

TABLE 1

| | |
|---|---|
| $\lambda_1 =$ | Rate of queries generated for an OSP SCP by the MA SCP (input rate to TMCP 1). |
| $\lambda_2 =$ | Rate of queries filtered through TMCP 1 (output rate at TMCP 1, input rate to TMCP 2). |

TABLE 1-continued $S_1 =$ The Counter Threshold at the TMCP 1. This value is kept constant.

$S_2 =$ The Counter Threshold at the TMCP 2. This threshold is a dynamic one and may changed every time a query is passed through TMCP 2.

$Q_1 =$ The Actual Queue length actual value of counter 1 at the TMCP 1 measured at the counter.

$Q_2 =$ The Actual Queue length actual value of counter 2 at the TMCP 2 measured at the counter.

$D_1 =$ Number of queries dropped at the TMCP 70 during an observation period.

$D_2 =$ Number of queries dropped at the TMCP 72 during an observation period.

$\mu_1 =$ The Negotiated Maximum Query rate for an OSP SCP. This rate must be specified for a time period referred to as an observation period (e.g., 100 milliseconds).

$\mu_2 =$ The Negotiated Average Query rate for an OSP SCP. This rate is normally expressed for a second time period that spans several observation periods.

$U =$ Actual query output rate to the OSP SCP as a function of time (queries per second or QPS).

Referring both to FIG. 6 and Table 1, the components of the Traffic Regulator are shown at the MA SCP in more detail. As indicated, the monitoring and control functions of each TMCP is accomplished by processing a discreet G/D/1/S queue, shown generally at 80, where G stands for General distribution function, D for Deterministic system, S for the size of the system, and 1 for the 1 server decrementing the queue at specific times. This type of queuing system is commonly referred to as a "Leaky Bucket" system. The threshold, $S_1$, for counter 74 is set at the counter decrementation rate and remains constant. The counter 74 at the TMCP 70 is incremented by 1 each time a query arrives at the counter and is reset to zero at the end of each observation period. The observation period may vary according to the rates negotiated between the OSP and the local exchange carrier. However, the interval should be small enough to provide a good estimate of the instantaneous maximum rate $\mu_1$ allowable during an observation period. Also, the observation period must be set in view of the negotiated traffic rate for the OSP SCP, as the interval must be large enough to allow at least one arrival during the observation period. The counter value $Q_1$ will never exceed the static threshold $S_1$ at any time.

The following example illustrates the above discussion. The local exchange carrier and an OSP negotiate to set the maximum rates for $\mu_1$ the OSP SCP at 40 queries per second and the observation interval at 100 milliseconds. As a result, the maximum number of queries that may be passed on to the TMCP 72 at the MA SCP is 4 queries every 100 milliseconds. ($\mu_1$ equals 4), At the end of each 100 millisecond interval, the counter is reset to zero. The value of the reset counter then increases by 1 during the next 100 millisecond observation period for each query that arrives at the counter. If the counter exceeds the static threshold $S_1$ of the counter 74 during the observation period, the Traffic Regulator drops all queries received after the threshold $S_1$ is exceeded during the observation period and default treats the calls associated with subsequent queries. Thus, the static threshold $S_1$ is preferably chosen to equal the maximum allowable rate $\mu_1$.

Referring to the TMCP 72 shown in FIG. 4, the monitoring and control of the TMCP 72 is also accomplished through a G/D/1/S queue 80. The counter 76 at the TMCP 72 also is incremented by 1 each time a query arrives at the TMCP 72 and is reset to zero at the end of the observation period. The counter 76 also tracks the second time period.

The second time period is greater in length than the observation period because, as mentioned earlier, the TMCP 72 is responsible for monitoring the average negotiated query rate over a time period consisting of several observation periods. At the end of each observation period the counter 76 is reset to zero. The counter value $Q_2$, as with the counter value $Q_1$, is set so as not to exceed the threshold $S_2$ at any time.

The counter 76 differs from the counter 74 in that the threshold $S_2$ is a dynamic threshold, as opposed to the static threshold $S_1$. Thus, as will be described in more detail below, the average negotiated rate that is controlled at the TMCP 72 may be exceeded during one or more observation periods, as long as the maximum negotiated rate is not exceeded during the observation period and the average rate is not exceeded during the second time period. As with the observation period, the value for the second time period is negotiated between the local exchange carrier and the OSP SCP. Preferably, the second time period spans the projected busy period during a particular time of day for OSP traffic (e.g., two hours a day). As with the decrementation rate at the counter 74, the decrementation rate at the counter 76 is set to the negotiated average rate $\mu_2$ and is reset to zero at the end of each observation period.

During the time observation period, the value of the counter 76 increases by 1 for each query received at the counter. If the number of queries within the observation period exceeds the dynamic threshold level $S_2$, the Traffic Regulator drops all subsequent queries and provides default treatment of the calls associated with the excess queries. At the end of the observation period, if the number of queries that has arrived at the TMCP 72 during the particular time interval is below the average rate $\mu_2$, the Traffic Regulator credits the OSP SCP. This credit is realized by the threshold $S_2$ of the counter being increased by 1. Therefore, during a subsequent observation period, the TMCP 72 will allow one more query to pass than in the previous observation period. Conversely, if the number of queries that arrive at the TMCP 72 during the observation period is above the average rate $\mu_2$, the Traffic Regulator debits the counter 76. The debit decreases the threshold of the counter 76 by 1 and thus allows 1 less query during the subsequent time observation period. However, the dynamic threshold level $S_2$ never goes below the counter decrementation rate. Therefore, $S_2$ is initially set equal to the counter decrementation rate and is allowed to increase if traffic rates to OSP SCP are below the average rate.

If the number of queries $\lambda_2$ that arrive at the TMCP 72 during the observation period is equal to average rate $\mu_2$, the value of $S_2$ remains constant. In summary, if the query arrives at the TMCP 72 during an observation period and the counter 76 is below the threshold $S_2$, the query will pass to the OSP SCP, as will be described below. If, however, the counter 76 is at or over the threshold $S_2$, the query will be dropped and the call associated with the query will receive default treatment. Thus, the dynamic threshold of the counter 76 may fluctuate between a lower bound, preferably equal to the counter decrementation rate $\mu_2$, and an upper bound that is selected based on a maximum allowable number of credits. Both the decrementation rate and the maximum allowable number of credits are based upon negotiated rates between the local exchange carrier and the OSP.

Regarding the dynamic threshold $S_2$, the following example illustrates the function of the upper limit to which the threshold may be increased: Several consecutive observation periods have elapsed in which the query rate has been below the negotiated average for a particular OSP SCP subscribing to mediated access services at a local exchange carrier MA SCP. The Traffic Regulator has, due to a period of low network traffic, credited the counter 74 associated with the TMCP 72 such that the counter threshold $S_2$ has increased to a large number. A period of traffic surplus then follows in which rates equal to the maximum allowable negotiated rate are allowed to pass for several observation periods through the TMCP 72 and through to the OSP SCP. If no upper bound existed for the threshold $S_2$, the counter would allow rates equal to the maximum to be forwarded to the OSP SCP over the second time period until the threshold $S_2$ is debited back to its normal value. During the period that $S_2$ is debited back to its normal value, query rates equal to the maximum are passed to the OSP SCP. As a result, the negotiated average rate would be exceeded. Thus, the upper limit is selected based on the consecutive number of observation periods at which the maximum number of queries per observation period is allowed to pass through the TMCP 72. The counter threshold $S_2$ may thus be mathematically expressed as follows:

$$\mu_2 \leq S_2 \leq (x+\mu_1),$$

where x is the number of consecutive intervals for which the query rates equal to their maximum are permitted to be sent to the OSP SCP. This rate is typically negotiated between the OSP and the MA SCP owner.

This mathematical expression of the upper limit of the counter 76 is used in the following example: The threshold $S_2$ of the counter 76 has been credited over several consecutive intervals of low query traffic. The maximum allowable negotiated rate has been set at 4 queries per 100 milliseconds, while the average negotiated rate is 2 queries every 100 milliseconds. If the negotiated rate between the local exchange carrier and the OSP is set at 300 (i.e., the counter 76 is set to allow the maximum rate of 4 queries per 100 milliseconds to pass for a maximum of 300 periods), and if traffic increases, from the equation above, the upper limit for $S_2$ equals 300+4=304. Thus, the greatest number of consecutive observation periods in which the average allowable negotiated rate would be allowed to be exceeded is 304.

Figure 7:
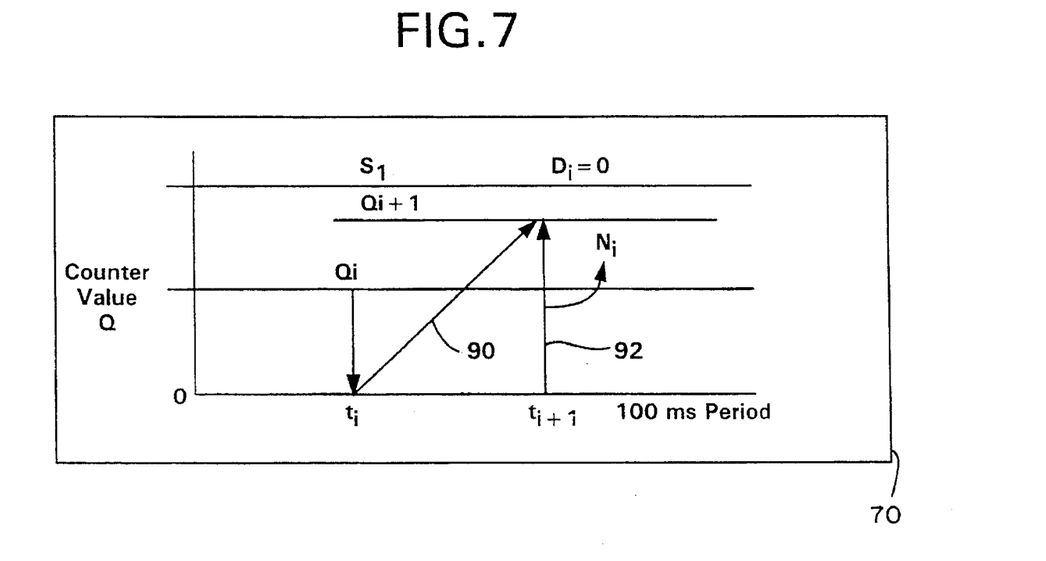
FIG. 7 is a graphical illustration of the changes in the counter value at the first traffic monitoring and control point without counter overflow.
Figure 8:
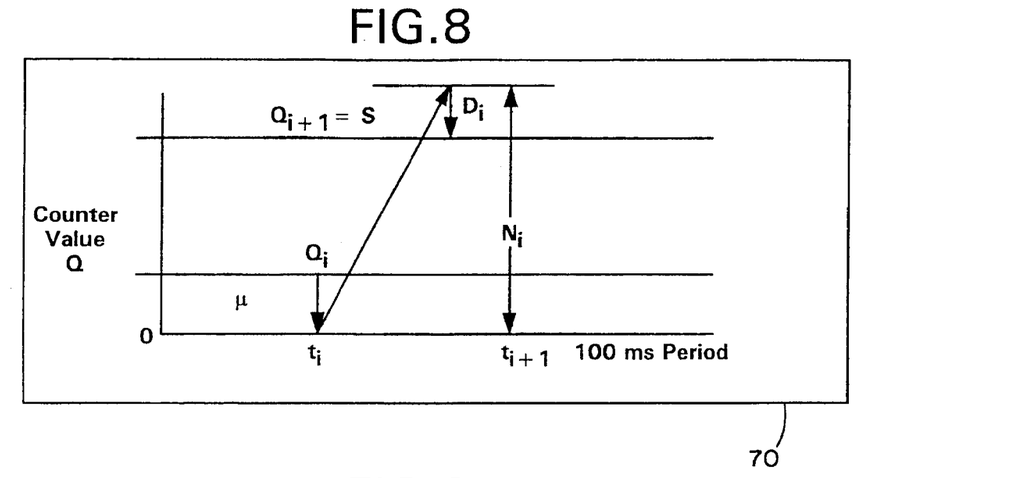
FIG. 8 is a graphical illustration of the changes in the counter value at the first traffic monitoring and control point with counter overflow.

FIGS. 7 and 8 graphically show the counter value Q and the TMCP 70 plotted versus an observation period $t_i$, $t_i+1$ in which the counter threshold $S_1$ is not, and is, exceeded, respectively. Referring also to FIG. 6, $t_i$ represents the beginning of a 100 millisecond observation period and $t_i+1$ represents the end the 100 millisecond time period. Initially, at $t_i$, the counter value $Q_1$ is reset to zero. Subsequently, during the following 100 millisecond observation period, queries are received, as indicated by the arrow 90, until the end of the observation period $t_i+1$. The arrow 92 represents the total number of queries received during the observation period, while $Q_i+1$ represents the queue length of the counter which corresponds to the number of queries received at the TMCP 70. As is shown in FIG. 7, the counter value $Q_i+1$ for the observation period is less than the counter threshold $S_1$, and thus no queries are dropped during the observation period.

FIG. 8 graphically shows the counter value $Q_i+1$ for an observation period in which the number of queries received at the TMCP 70 exceeds the threshold value $S_1$. At the beginning of the observation interval $t_i$, the counter value is reset to zero. As shown, queries then arrive at the TMCP 70 as indicated by the arrow at 100. During the observation interval, the number queries received exceeds the counter threshold value $S_1$. Correspondingly, all queries received subsequent to the threshold $S_1$ being reached are dropped and default treated as previously discussed.

Figure 9:
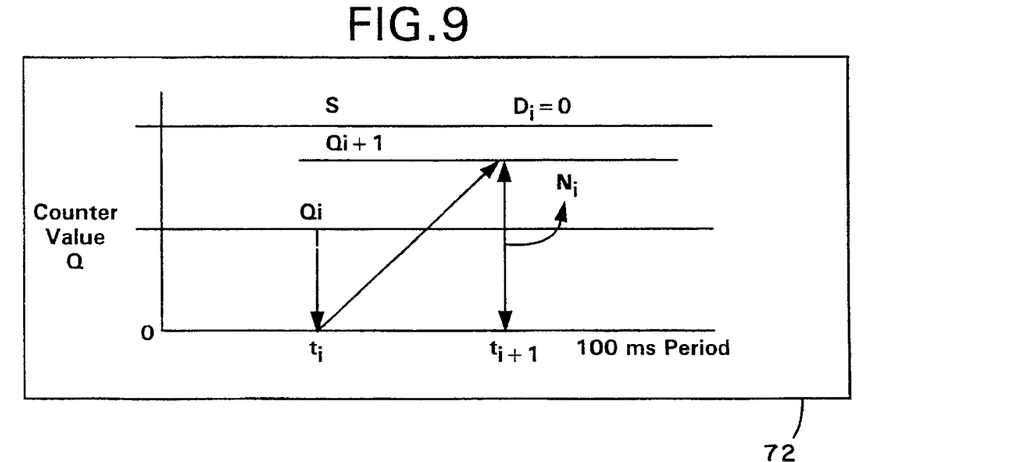
FIG. 9 is a graphical illustration of changes in the counter value at the second traffic monitoring and control point without counter overflow.
Figure 10:
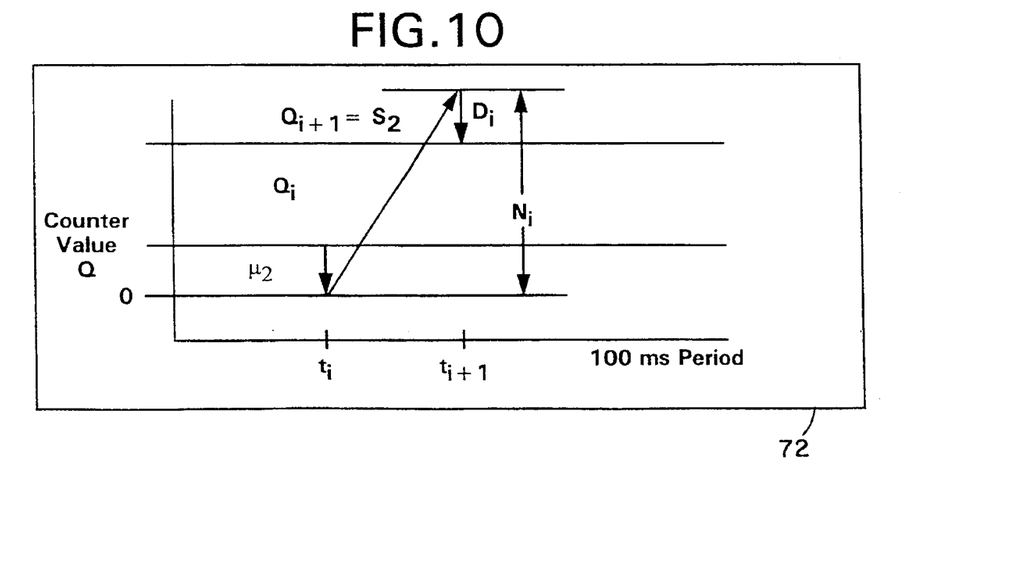
FIG. 10 is a graphical illustration of changes in the counter value at the second traffic monitoring and control point with counter overflow.

FIGS. 9 and 10 graphically show the counter value Q at the TMCP 72 plotted versus an observation period $t_i$, $t_i+1$ in which the counter threshold $S_2$ is not, and is, exceeded, respectively. Referring also to FIG. 6, $t_i$ represents the beginning of a 100 millisecond observation period and $t_i+1$ represents the end the 100 millisecond time period. Initially, at $t_i$, the counter value $Q_2$ is reset to zero. Subsequently, during the following 100 millisecond observation period, queries are received, as indicated by the arrow 90, until the end of the observation period $t_i+1$. The arrow 92 represents the total number of queries received during the observation period, while $Q_i+1$ represents the queue length of the counter which corresponds to the number of queries received at the TMCP 72. As is shown in FIG. 7, the counter value $Q_i+1$ for the observation period is less than the counter threshold $S_2$, and thus no queries are dropped during the observation period.

FIG. 10 graphically shows the counter value $Q_i+1$ for an observation period in which the number of queries received at the TMCP 72 exceeds the threshold value $S_2$. At the beginning of the observation interval $t_i$, the counter value is reset to zero. As shown, queries then arrive at the TMCP 72 as indicated by the arrow at 100. During the observation interval, the number of queries received exceeds the counter threshold value $S_2$. Correspondingly, all queries received subsequent to the threshold $S_2$ being reached are dropped and default treated as previously discussed.

Figure 11:
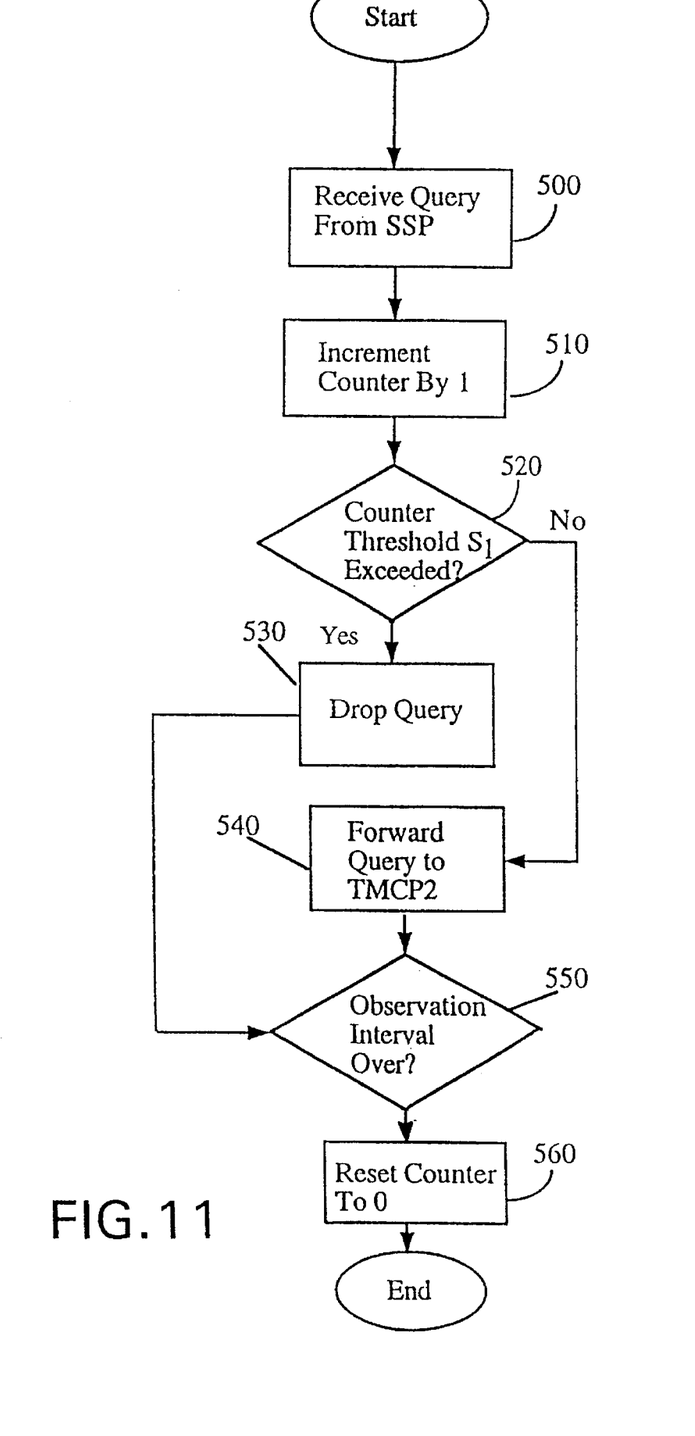
FIG. 11 is a flow diagram illustrating the general method used for processing a query generated at an SSP and received at the first traffic monitoring and control point of the traffic regulator of the present invention.

FIG. 11 is a flow diagram showing the query traffic regulation functions performed by the Traffic Regulator at the MA SCP in the embodiment shown in FIG. 2.

At step 500, the TMCP 70 receives a query from an SSP. Upon detection of this query, the TMCP 70 increments the counter 74 by 1, as indicated at step 510. At step 520, as the counter is incremented by 1, the TMCP checks to see if the counter threshold $S_1$ is exceeded. If the counter threshold is exceeded, the Traffic Regulator will drop the query and default treat the call, as described above and as indicated at step 530. If the counter threshold $S_1$ is not exceeded, the TMCP 70 allows the query to pass on to the TMCP 72, as indicated at step 540. At step 550, the TMCP 70 next checks to see if the observation period has been exceeded. If the observation period has reached its maximum value, the counter resets to zero as indicated at step 560, the method returns to step 500, and the TMCP 70 begins to receive queries in a subsequent observation period. If the maximum value for the observation period has not been exceeded, the counter retains its current value Q1, the method returns to step 500, and the counter continues to receive queries during the same observation interval.

Figure 12A:
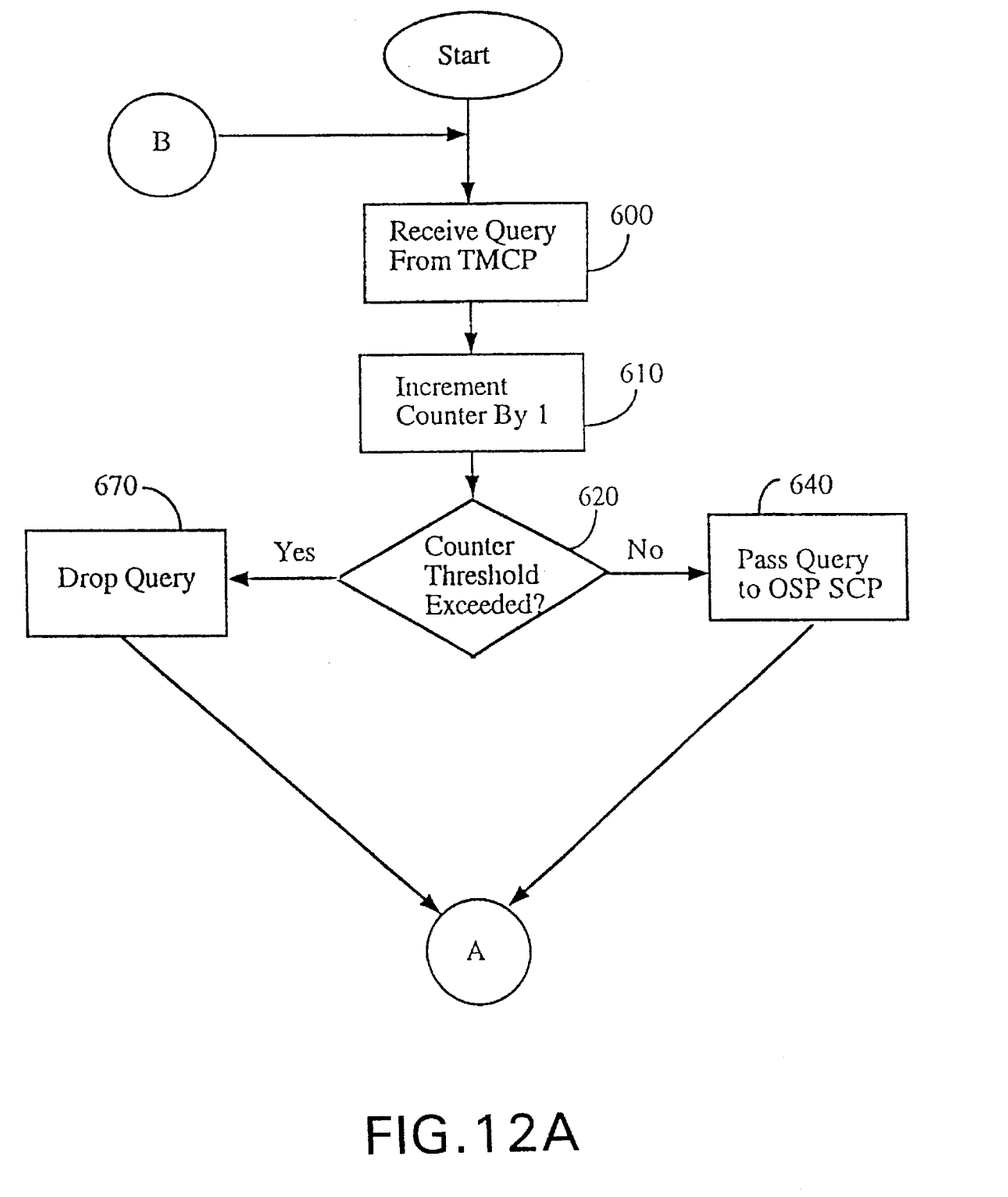
FIG. 12 is a flow diagram illustrating the general method used for processing a query passed from the first traffic monitoring and control point to the second traffic monitoring and control point of the traffic regulator of the present invention.
Figure 12B:
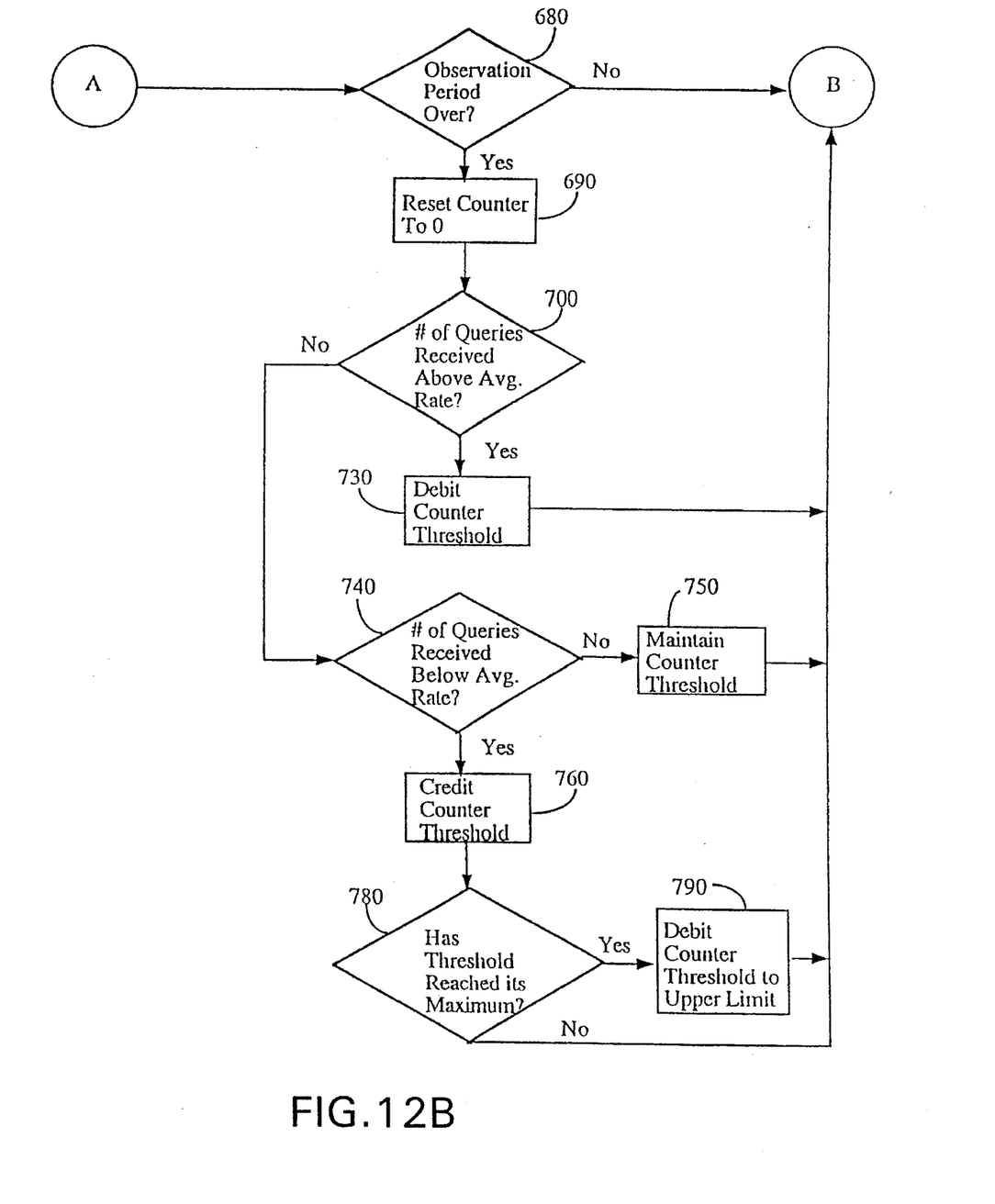

FIG. 12, consisting of FIGS. 12a and 12b, is a flow diagram showing the query traffic regulation functions performed at the TMCP 72 at the MA SCP as illustrated in FIG. 2. At step 600, the TMCP 72 receives a query from the TMCP 70. Subsequently, at step 610, the counter 76 is incremented by 1. At step 620, the TMCP 72 determines whether the counter threshold $S_2$ is exceeded. If the threshold $S_2$ is not exceeded, then at step 640, the query is passed to the OSP SCP for which it is destined. Subsequent to passing the query, the TMCP 72 determines whether the observation period is over at step 680 (FIG. 12b). If the observation period is not over, the method returns to step 600 to receive another query from the TMCP 70. If the observation period is over, the counter 76 is reset to zero at step 690 then proceeds to step 700 as discussed below.

Referring again to step 620, at which the TMCP 72 determines whether the query threshold $S_2$ is exceeded, if the threshold indeed is exceeded, the method proceeds to step 670 and the TMCP 72 drops the query and provides default treatment to the associated call. Then, at step 680, the TMCP 72 determines whether the observation period is over. If the observation period is not over, the method returns to step 600 where another query is received during the observation period.

If the observation period is over, the TMCP 72 resets the counter to zero at step 690. Subsequently, at step 700, the TMCP 72 determines whether the number of queries received during the observation period is above the average negotiated rate. If the number of queries received is above the average negotiated rate, the method proceeds to step 730 where the TMCP 72 debits the counter threshold, and thereafter returns to step 600. Referring again to step 700, if the number of queries during the observation period is not above the average rate, the method branches to step 740. At step 740, the TMCP 72 determines whether the number of queries received during the observation period at the TMCP 72 is below the average negotiated rate. If the number of queries is not below the average rate, the number of queries received equals the average query rate, and the counter threshold is maintained as indicated at step 750. The method then returns to step 600. At step 740, if the number of queries received is below the average negotiated rate, the TMCP 72 credits the counter threshold, as indicated at step 760. At step 780, the TMCP 72 next determines whether the threshold has reached its maximum. If the threshold has not exceeded its maximum, the method then returns to step 600. If, at step 780, the threshold has exceeded its maximum, the TMCP 72 debits the counter threshold to the upper limit at step 790, and the method returns to step 600. If the number of queries received is below the average negotiated rate, the TMCP 72 credits the counter threshold, as indicated at step 750. Subsequently, the method returns to step 600.

From the above foregoing description, it will be appreciated that the embodiment of the present invention meets the objects stated above for regulating and managing network traffic at a mediated access service control point in an open advanced intelligent network environment. The present invention addresses the problems and potential problems described in the background of the invention. From the foregoing description of the embodiment of the present invention, other embodiments will suggest themselves to those skilled in the art. Therefore, the present invention should be limited only by the claims below and the equivalents thereof.

What is claimed is:

1. A method of controlling and regulating traffic in an intelligent switched telephone network, comprising:

providing at least one mediated access service control point and at least one other service providers service control point, said mediated access service control point regulating the traffic intended for said OSP service control point through first and second traffic monitoring and control points;

said first traffic monitoring and control point operative for limiting the number of queries generated by and passed from network service switching points to said OSP service control point through said mediated access service control point to a predetermined maximum during an observation period;

said second traffic monitoring and control point operative for limiting the number of queries passed from said service switching points through said mediated access service control point to said OSP service control point to sustain a predetermined average during a second time period, said second time period comprising at least one observation period;

causing queries destined for said OSP service control point to be passed from said service switching points to said mediated access service control point;

at said first traffic monitoring and control point, if said number of queries passed to said mediated access service control point in said observation period is greater than the predetermined maximum number of queries, dropping all queries in excess of said maximum number;

at said first traffic monitoring and control point, if said number of queries is less than said predetermined maximum number for said observation period, passing said queries to said second traffic monitoring and control point;

at said second traffic monitoring and control point, if said number of queries received during said observation period is greater than said predetermined average, allowing said queries to pass and adjusting said second traffic monitoring and control point to pass a greater number of queries during the subsequent observation period;

at said second traffic monitoring and control point, if the number of queries is less than said predetermined average, allowing said queries to pass and adjusting said second traffic monitoring and control point to pass a greater number of queries during the subsequent observation period;

at said second traffic monitoring and control point, if the number of queries is greater than said predetermined average for a predetermined maximum number of observation periods, maintaining the number of queries allowed to pass at said second traffic monitoring and control point during the subsequent observation period to sustain the average rate over said second time period; and providing a query output from said second traffic monitoring control point to said OSP service control point;

whereby said method allows OSP service control point query rate reduction and minimizes overload and performance degradation at said OSP service control point.

2. A method of controlling and regulating traffic in an intelligent switched telephone network as recited in claim 1, wherein said step of adjusting said second traffic monitoring and control point to pass a greater number of queries during the subsequent observation time period comprises the step of incrementing the value of a counter threshold at said second traffic monitoring and control point by one to allow an additional query to pass to said OSP service control point during said subsequent observation time period.

3. A method of controlling and regulating traffic in an intelligent switched telephone network as recited in claim 1, wherein said step of adjusting said second traffic monitoring and control point to pass a lesser number of queries during the subsequent observation period comprises the step of decrementing the counter threshold at said second traffic monitoring and control point by one to allow one less query to pass to said destination OSP service control point during the subsequent observation period.

4. A method of controlling and regulating traffic in an intelligent switched telephone network as recited in claim 1, whereby said OSP service control point rate reduction OSP service control point provides for generating a signal to be received by said mediated access service control point, said signal receipt by said mediated access service control point causing said mediated access service control point to change said predetermined maximum number of queries during an observation period for said first traffic monitoring and control point.

5. A method of controlling and regulating traffic in an intelligent switched telephone network as recited in claim 1, wherein said steps of dropping all queries in excess of said maximum allowable number and passing said queries to said second traffic monitoring and control point during said observation period at said first traffic monitoring and control point comprise providing a static counter for tracking the number of queries destined for said OSP service control point, said static counter being incremented by one upon detection of a query intended for said OSP service control point, said static counter decremented to zero upon expiration of said observation period.

6. A method of controlling and regulating traffic at a mediated access service control point in an advanced intelligent network system including a plurality of service switching points at a plurality of central offices, at least one mediated access service control point, a plurality of other service providers service control points, and at least one signal transfer point, comprising the steps of:

provided a Traffic Regulator at said mediated access service control point, said Traffic Regulator comprising a first traffic monitoring and control point for regulating the maximum query rate over an observation period and a second traffic monitoring and control point for monitoring the average query rate over a second time period, said first traffic monitoring and control point having a static counter and said second traffic monitoring and control point having a dynamic counter;

receiving queries destined for said OSP service control points at said first traffic monitoring and control point;

at said first traffic monitoring and control point, if said maximum query rate is exceeded during said observation period, dropping said queries received subsequent to said maximum query rate being exceeded;

at said first traffic monitoring and control point, if said maximum query rate is not exceeded during said observation period, forwarding all of said received queries to said second traffic monitoring and control point;

at said second traffic monitoring and control point, if said average query rate is exceeded during said observation period, decrementing the dynamic counter threshold by one if such decrementation does not cause the threshold in said dynamic counter to go below the initial threshold value;

at said second traffic monitoring and control point, if said average query rate is not exceeded during said observation period, incrementing said dynamic counter threshold by one; and at said second traffic monitoring and control point, if said average rate has exceeded for a predetermined number of observation periods maintaining said dynamic counter threshold at its present level so that said average rate is not exceeded over said second time period;

outputting said queries from said second traffic monitoring and control point to said OSP service control points;

whereby said method prevents said maximum query rate for said destination OSP service control point from being exceeded during any observation period and prevents said average query rate from being exceeded over any said second time period.

7. A method of controlling and regulating traffic in an intelligent switched telephone network as recited in claim 6, after said step of maintaining the number of queries allowed to pass during said subsequent observation periods, further comprising the step of passing queries in subsequent observation periods after said dynamic counter decreases after a number of subsequent observation periods in which the number of queries is more than said average query rate and less than said maximum query rate.

8. A method of controlling and regulating network traffic intended for other service providers service control points from service switching points in an intelligent switched telephone network, comprising the steps of:

at a first traffic monitoring and control point implemented at a mediated access service control point, regulating the maximum number of queries passed to said OSP service control points during an observation period said first traffic monitoring and control point having a first counter associated therewith;

at a second traffic monitoring and control point implemented at said mediated access service control point regulating the average number of queries received by said OSP service control points, during a second time period said second time period being greater than said observation period;

receiving a query intended for an OSP service control point at said first traffic monitoring and control point;

if said query causes the number of queries received at said first traffic monitoring and control point to exceed a maximum number allowed for said OSP service control point during said observation period, dropping said query;

if said query does not cause the number of queries received at said first traffic monitoring and control point for said OSP service control point to exceed a maximum number allowed during said observation period, passing said query to said second traffic monitoring and control point;

at said second traffic monitoring and control point, if said query causes said number of queries received at said second traffic monitoring and control point for said OSP service control point to exceed an average number allowable during said observation period, decrementing a second counter located at said second traffic monitoring and control point by one;

if said query does not cause said number of queries received at said second traffic monitoring and control point for said OSP service control point to exceed said average number allowed during said observation period, decrementing said second counter by one unit;

at said second traffic monitoring and control point, if said second counter is incremented by a predetermined maximum number, maintaining said counter at a count associated with said maximum number; and resetting said first and second counters to zero after the end each of the observation periods;

whereby said method is an effective method for regulating the flow of traffic to said OSP service control points and for enforcing negotiated traffic rates between the mediated access service control point and said service provider service control point.

* * * * *